United States Patent
Zapletal

(10) Patent No.: US 11,058,980 B2
(45) Date of Patent: Jul. 13, 2021

(54) CYCLONE FOR SEPARATION OF GAS-LIQUID MIXTURE, AND A REFRIGERANT ACCUMULATOR CONTAINING THIS CYCLONE

(71) Applicant: Hanon Systems, Daejeon (KR)

(72) Inventor: Jiri Zapletal, Ostrava-Poruba (CZ)

(73) Assignee: HANON SYSTEMS, Daejeon (KR)

( * ) Notice: Subject to any disclaimer, the term of this patent is extended or adjusted under 35 U.S.C. 154(b) by 63 days.

(21) Appl. No.: 16/101,769

(22) Filed: Aug. 13, 2018

(65) Prior Publication Data

US 2020/0047098 A1 Feb. 13, 2020

(30) Foreign Application Priority Data

Aug. 31, 2017 (CZ) ................................. CZ2017-507

(51) Int. Cl.
| | | |
|---|---|---|
| *B01D 45/16* | (2006.01) | |
| *F25B 31/00* | (2006.01) | |
| *F25B 43/00* | (2006.01) | |
| *F25B 43/02* | (2006.01) | |

(52) U.S. Cl.
CPC ............ *B01D 45/16* (2013.01); *F25B 31/002* (2013.01); *F25B 43/006* (2013.01); *F25B 43/02* (2013.01); *F25B 2309/06* (2013.01); *F25B 2400/02* (2013.01); *F25B 2400/03* (2013.01)

(58) Field of Classification Search
CPC ........ F25B 43/02; F25B 31/002; F25B 43/06; F25B 43/006; F25B 2400/03; F25B 2400/02; F25B 2309/06; F25B 2400/054; F25B 2400/051; F25B 2500/18; F25B 9/08

See application file for complete search history.

(56) References Cited

U.S. PATENT DOCUMENTS

| 4,651,540 A | * | 3/1987 | Morse | ................... | F25B 43/006 55/441 |
|---|---|---|---|---|---|
| 5,076,071 A | * | 12/1991 | Morse | ................... | F25B 43/006 62/503 |

(Continued)

FOREIGN PATENT DOCUMENTS

| DE | 10040770 A1 * | 3/2001 | .......... C10M 107/34 |
|---|---|---|---|
| DE | 10300801 B3 * | 6/2004 | ............ F25B 43/006 |

(Continued)

*Primary Examiner* — Kun Kai Ma
(74) *Attorney, Agent, or Firm* — Shumaker, Loop & Kendrick, LLP; James D. Miller

(57) ABSTRACT

The present solution provides a cyclone for separation of gas-liquid mixtures, particularly suitable for a refrigerant accumulator or an accumulator with an internal heat exchanger in a vehicle air conditioning system using carbon dioxide as refrigerant, including an inlet of the gas-liquid mixture and a body of the cyclone with an inlet chamber, an outlet chamber, and at least one stationary vane in the form of a helix to ensure rotation of the mixture in the cyclone outlet chamber, where the gas-liquid mixture inlet is arranged substantially coaxially with the axis of the cyclone and opens directly into the inlet chamber of the cyclone body. The solution further provides a refrigerant accumulator and an accumulator with an integrated internal heat exchanger which includes the cyclone according to the invention.

9 Claims, 4 Drawing Sheets

(56) References Cited

U.S. PATENT DOCUMENTS

| | | | | |
|---|---|---|---|---|
| 5,334,239 A | * | 8/1994 | Choe | B01D 19/0031 55/337 |
| 5,440,094 A | * | 8/1995 | Zapletal | H05H 1/34 219/121.48 |
| 6,062,039 A | * | 5/2000 | Haramoto | F25B 43/006 62/503 |
| 7,918,107 B2 | * | 4/2011 | Klotten | F25B 40/00 62/503 |
| 2002/0095948 A1 | * | 7/2002 | Corrigan | B01D 45/16 62/503 |
| 2006/0196221 A1 | * | 9/2006 | Westermeyer | F25B 43/02 62/470 |
| 2009/0044563 A1 | * | 2/2009 | Heckt | F25B 40/00 62/503 |
| 2012/0151957 A1 | * | 6/2012 | Kamiyama | F25B 43/006 62/430 |
| 2015/0345844 A1 | * | 12/2015 | Koster | F25B 31/004 62/512 |
| 2017/0016657 A1 | * | 1/2017 | Hosokawa | F25B 13/00 |

FOREIGN PATENT DOCUMENTS

| | | |
|---|---|---|
| JP | H07103620 A | 4/1995 |
| JP | 2008215727 A | 9/2008 |
| JP | 2014105907 A | 6/2014 |
| KR | 20070099759 A | 10/2007 |
| KR | 20090110647 A | 10/2009 |

\* cited by examiner

CYCLONE FOR SEPARATION OF GAS-LIQUID MIXTURE, AND A REFRIGERANT ACCUMULATOR CONTAINING THIS CYCLONE

CROSS-REFERENCE TO RELATED PATENT APPLICATIONS

This patent application claims the benefit of Czech Patent Application No. PV 2017-507 dated Aug. 31, 2017, the disclosure of which is hereby incorporated herein by reference in its entirety.

FIELD OF THE INVENTION

The present invention relates to a cyclone for separation of gas-liquid mixture, in particular for a refrigerant accumulator or an accumulator with an internal heat exchanger in a vehicle air conditioning system with carbon dioxide as refrigerant (technical grade R744).

BACKGROUND OF THE INVENTION

The refrigeration and air conditioning systems contain refrigerant accumulators in which the liquid component of the refrigerant is separated from the gaseous component of the refrigerant, and together with the liquid component, liquid oil is separated.

The accumulator then provides for the addition of a precisely metered quantity of oil to the gaseous refrigerant that exits into other parts of the refrigeration or air conditioning circuit. Refrigerant accumulators may also include integrated internal heat exchangers. Such refrigerant accumulators are described, for example, in US 2015/0345844.

In the vehicle air conditioning system, refrigerants R134a or R1234yf are very often used. The use of carbon dioxide (technical grade R744) is newly proposed. A mixture of liquid $CO_2$, gaseous $CO_2$ and a small amount of liquid oil enters into the accumulator or accumulator with the internal exchanger, where the liquid components have to be separated by the cyclone separation function so that only the gaseous $CO_2$ with the precisely metered quantity of oil exits from the accumulator or accumulator with the internal exchanger (US2009/0044563). The technical requirements for the R744 air conditioning circuit are incomparably higher than for air conditioning circuits with other refrigerants used so far.

In existing air conditioning systems, the separation of the liquid and gaseous components of the refrigerant is ensured either by simple sedimentation of the liquid component or by regulating the pressure and temperature conditions. These methods are not sufficient for separation of the R744 refrigerant.

The cyclone is currently considered to be the most suitable component for the distribution of a mixture of liquid $CO_2$, gaseous $CO_2$ and a small amount of liquid oil because its production costs are relatively low, construction is simple, and works with acceptable pressure losses.

Cyclones with a radial inlet (US2015/0345844) and stationary vanes in the shape of a helix are available which ensure the rotation of the mixture that is separated into individual components by centrifugation. However, the radial-inlet structure cyclone assumes an inlet pipe being tangentially oriented to the cyclone inlet chamber; this pipe is bent at substantially right angles due to the need for connection to other components. From a production point of view, this type of cyclone must always be assembled from at least two or three components (the cyclone body, one or two bent pipes and the connecting piece) where the individual parts need to be joined or made by expensive and complex methods of plastic injection moulding (e.g. external gas injection moulding, GAD). Furthermore, there is an increased risk of damage to the tangentially oriented inlet pipe during subsequent assembly operations. The advantage of this type of cyclone is the excellent separation of liquid components and the constant distribution of gas.

There are cyclones with an axial or substantially axial inlet, but they do not contain a stationary vane to ensure rotation of the mixture and do not achieve sufficient separation of components or simplicity of construction. In these cyclones, the mixture rotation is uneven, chaotic and does not achieve the desired quality of the outgoing medium.

SUMMARY OF THE INVENTION

The object of the present invention is a cyclone for separation of gas-liquid mixtures, particularly suitable for a refrigerant medium accumulator or an accumulator with an internal heat exchanger in a vehicle air conditioning system using carbon dioxide (technical grade R744) as a refrigerant medium, comprising a gas-liquid mixture inlet and a cyclone body with an inlet chamber, an outlet chamber and at least one stationary helical vane, preferably one stationary helical vane, to ensure rotation of the mixture in the cyclone outlet chamber, the essence of which is that the gas-liquid mixture inlet is arranged substantially coaxially with the axis of the cyclone and opens directly into the inlet chamber of the cyclone body.

The term "substantially coaxially" means a deviation from the cyclone axis in the range of 0 to 25 degrees.

The flow of the medium at the outlet from the cyclone vane is oriented substantially perpendicular to the cyclone axis and tangentially to the diameter of the cyclone inlet chamber, and preferably the vane is flat at its outlet end.

This cyclone design layout, i.e. a combination of a substantially axial mixture inlet with a helical vane, allows easier and cost-effective production as a single piece, for example by injection moulding. It is also more durable in subsequent assembly operations because there is no easy-to-destroy tangentially located inlet pipe. Replacing the tangential inlet of the mixture with the axial one does not reduce the efficiency of separating the components nor disturb other advantages of the known cyclones with radial inlet. The axial design also enables standardization of the cyclone for the heat transfer medium accumulator and the accumulator with the internal heat exchanger.

The helical vane changes the direction of the mixture flow so that the outlet at the end of the vane releases the mixture tangentially into the outlet chamber, in which part the mixture is rotating and the separation of liquid particles from the gas begins.

The cyclone is preferably made of plastic, more preferably made by injection moulding. It can also be made of metal.

A further object of the invention is a set of the cyclone and a lid of an accumulator, where the cyclone is on the side of the inlet chamber coaxially connected to the lid of the refrigerant accumulator or accumulator with an internal heat exchanger, and the inlet of the gas-liquid mixture passes through the lid substantially coaxially with the lid and cyclone axis, and opens into the cyclone inlet chamber.

The object of the present invention is also the use of the cyclone of the invention to separate the gaseous carbon dioxide from the liquid carbon dioxide and/or liquid oil in refrigerant accumulators or accumulators with an internal heat exchanger in vehicle air conditioning systems using carbon dioxide (technical grade R744).

The invention further comprises the refrigerant accumulator containing a vessel consisting of a lid, a bottom and a shell, wherein the cyclone of the present invention is coaxially connected to the lid, the inlet of the gas-liquid mixture passes through the lid substantially coaxially with the lid and cyclone axis and opens into the cyclone inlet chamber, wherein a suction pipe assembly passes between the lid and bottom of the vessel to pipe away the gaseous refrigerant component; a deflector is placed behind the cyclone outlet chamber, wherein the means for enriching the gaseous refrigerant with a pre-determined amount of oil are provided at the bottom of the vessel, and wherein the suction pipe assembly for piping away the gaseous refrigerant component comprises an outer suction pipe for piping away the gaseous refrigerant component from the cyclone and deflector to the means for enriching the gaseous refrigerant with oil and an inner pipe for piping away the gaseous refrigerant component from means for enriching the gaseous refrigerant with oil through the lid out of the accumulator. In the vessel of the accumulator, the liquid refrigerant component and the oil accumulate, wherein part of the oil is returned to the refrigerant through means for enriching the gaseous refrigerant with oil.

In the accumulator, the outlet of the liquid phase from the cyclone opens into the accumulator vessel for the liquid phase accumulation, wherein the liquid phase separation takes place due to the rotation imparted by the cyclone vane on the outer edge of the deflector integrated with the suction pipe assembly, where the gaseous phase is piped away by the outer suction pipe to be enriched with a defined amount of oil at the bottom of the vessel and then by the inner suction pipe through the lid of the vessel out into the air conditioning circuit.

The invention further comprises an accumulator with an internal heat exchanger consisting of an outer vessel comprising a lid, a bottom and a shell, and an inner vessel (canister), wherein the lid is coaxially connected to the cyclone of the present invention; the inlet of the gas-liquid mixture passes through the lid substantially coaxially with the lid and cyclone axis and opens into the cyclone inlet chamber, wherein a suction pipe assembly passes between the lid and bottom of the vessel to pipe away the gaseous refrigerant component; a deflector is placed behind the cyclone outlet chamber in the inner vessel, wherein the means for enriching the gaseous refrigerant with a pre-determined amount of oil are provided at the bottom of the inner vessel, and wherein a heat exchanger is arranged between the outer wall of the inner vessel and the inner wall of the outer vessel, for example in the form of a helically guided tube, and wherein the suction pipe assembly for piping away the gaseous refrigerant component comprises an outer suction pipe for piping away the gaseous refrigerant component from the cyclone and deflector to the means for enriching the gaseous refrigerant with oil and an inner pipe for piping away the gaseous refrigerant component from means for enriching the gaseous refrigerant with oil through the lid into the outer vessel of the accumulator where heat may be exchanged between the refrigerant medium and the medium coming from the warmer part of the air conditioning circuit. In the inner vessel of the accumulator, the liquid refrigerant component and the oil accumulate, wherein part of the oil is returned to the refrigerant through means for enriching the gaseous refrigerant with oil.

In the accumulator with an internal heat exchanger, the outlet of liquid phase from the cyclone opens into the inner vessel (canister) which performs the function of the accumulator for collecting the liquid phase, where the liquid phase separation takes place on the outer edge of the deflector and the gaseous phase is piped away by the suction pipe assembly, wherein the gaseous phase is delivered by the outer suction pipe to be enriched with a defined amount of oil at the bottom of the vessel and then by the inner suction pipe through the lid of the vessel into the internal exchanger located in the outer vessel it is piped away through the gas filter and the bottom of the vessel further into the air conditioning circuit.

DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE INVENTION

The description and drawings serve to enable one skilled in the art to make and use the invention, and are not intended to limit the scope of the invention in any manner. In respect of the methods disclosed, the order of the steps presented is exemplary in nature, and thus, is not necessary or critical.

EXAMPLES

Example 1

Figure 1:
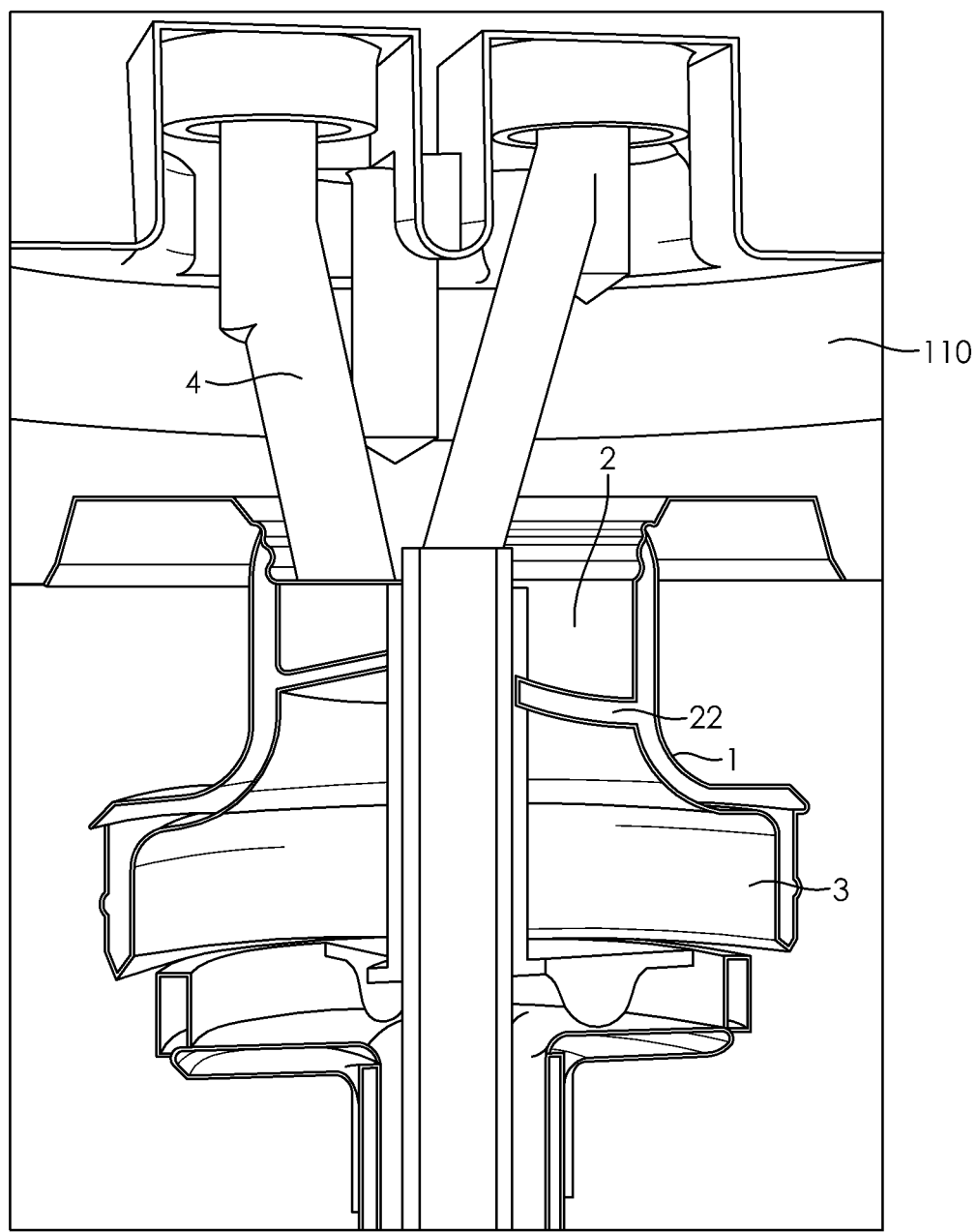
FIG. 1 shows a cyclone with an axial inlet and a lid of the accumulator vessel of Example 1.

FIG. 1 shows a cyclone with an axial inlet and a lid 110 of the accumulator for separating the liquid and gaseous components from the inlet mixture of the liquid and gaseous components. The cyclone comprises a cyclone body 1 with one stationary vane 22 in the form of a helix for causing the rotational movement of the inlet mixture, a cylindrical inlet chamber 2, and an outlet chamber 3 which widens gradually from the outlet of the vane 22.

The cyclone is fitted on the lid 110 of the accumulator of heat exchange medium, and the inlet bore 4 in the lid 110 opens axially to the inlet chamber 2 substantially in the direction of the cyclone axis. The vane 22 in the form of a helix changes the direction of mixture flow so that the outlet at the end of the vane 22 transfers the mixture tangentially to the outlet chamber 3, in which part the mixture is already rotating and the separation of the liquid particles from the gas begins.

Cyclone is usually made of plastic by injection moulding, or by other method using different material.

Example 2

Figure 2:
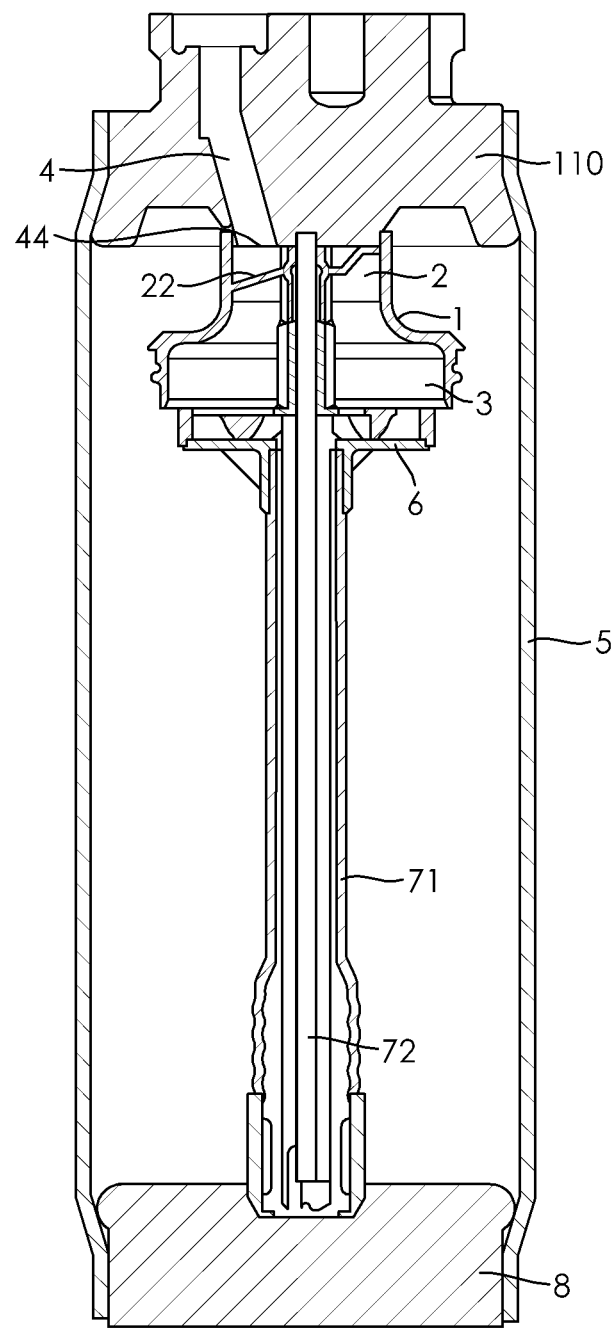
FIG. 2 shows a cyclone with an axial inlet in the accumulator of Example 2.

FIG. 2 shows a refrigerant accumulator that contains a vessel comprising a lid 110, a bottom 8, and a shell 5, wherein the lid 110 is coaxially connected to the cyclone of the present invention. In the lid, there is an inlet bore 4 passing through the lid substantially coaxially with the axis of the lid 110 and cyclone. The inlet bore 4 brings the mixture of liquid and gas through the axial inlet 44 to the inlet chamber 2 of the cyclone. An assembly of suction pipes 71, 72 passes between the lid 110 and the bottom 8 of the vessel to pipe away the gaseous refrigerant component. A deflector 6 is situated behind the cyclone outlet chamber 3, wherein the means for enriching the gaseous refrigerant with a pre-determined amount of oil are situated at the bottom 8 of the vessel (such means are disclosed, for example, in US 2015/0345844). The assembly of suction pipes 71, 72 to pipe away the gaseous refrigerant component comprises an outer suction pipe 71 for piping away the gaseous refrigerant component from the cyclone and deflector 6 to the means for enriching the gaseous refrigerant with oil and an inner pipe 72 for piping away the gaseous refrigerant component from the means for enriching the gaseous refrigerant with oil through the lid 110 out of the accumulator. In the vessel of the accumulator, the liquid refrigerant component and the oil accumulate.

In the accumulator, the outlet of the liquid phase from the cyclone opens into the vessel of the accumulator for collecting the liquid phase, wherein the liquid phase separation takes place due to the rotation imparted by the cyclone vane 22 on the outer edge of the deflector 6 integrated with the assembly of suction pipes 71, 72, where the gaseous phase is piped away by the outer suction pipe 71 to be enriched with a defined amount of oil at the bottom of the vessel and then by the inner suction pipe 72 through the lid 110 of the vessel further to the air conditioning circuit.

Example 3

Figure 3:
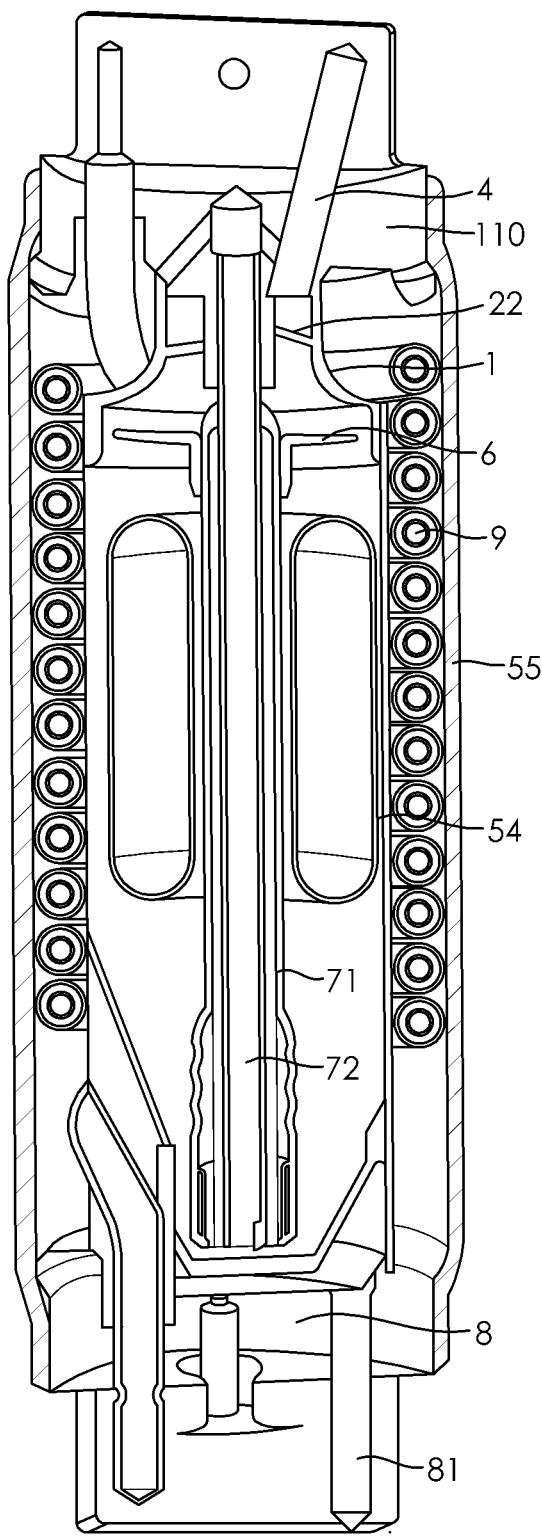
FIG. 3 shows a cyclone with an axial inlet in the accumulator with an internal heat exchanger of Example 3.

FIG. 3 shows an accumulator with integrated internal heat exchanger that contains an outer vessel comprising a lid 110, a bottom 8, and a shell 55, and an inner vessel 54, wherein the lid 110 is coaxially connected to the cyclone of the present invention. The gas-liquid mixture passes through the lid 110 through a bore 4 substantially coaxial with the axis of the lid 110 and cyclone and axially enters the inlet chamber of the cyclone body 1; between the vessel lid 110 and bottom 8, an assembly of suction pipes 71, 72 passes to pipe away the gaseous refrigerant component; a deflector 6 is located behind the cyclone outlet chamber in the inner vessel 54. In the bottom of the inner vessel 54 there are means for enriching the gaseous refrigerant with a pre-determined amount of oil. A heat exchanger in the form of a helically guided tube 9 is provided between the outer wall of the inner vessel 54 and the inner wall of the shell 55 of the outer vessel through which the refrigerant passes from the warmer area of the air conditioning circuit. The suction pipe assembly for piping away the gaseous refrigerant component comprises an outer suction pipe 71 for piping away the gaseous refrigerant component from the cyclone and deflector 6 to the means for enriching the gaseous refrigerant with oil and an inner pipe 72 for piping away the gaseous refrigerant component from means for enriching the gaseous refrigerant with oil through the lid 110 into the accumulator outer vessel, where heat exchange may occur between the refrigerant medium and the second heat exchange medium, and then through an outlet 81 in the bottom 8 of the vessel. In the inner vessel 54, the liquid refrigerant component and the oil accumulate.

In the accumulator with an internal heat exchanger, the outlet of the liquid phase from the cyclone opens into the inner vessel 54 (canister) performing the function of the accumulator for collecting the liquid phase, where the liquid phase separation takes place on the outer edge of the deflector 6 and the gaseous phase is piped away by the assembly of suction pipes 71, 72; wherein the gaseous phase is delivered by the outer suction pipe 71 to be enriched with a defined amount of oil at the bottom of the vessel 54 and then by the inner suction pipe 72 through the lid 110 of the vessel into an internal heat exchanger 9 located in the outer vessel it is piped away through the gas filter and the bottom 8 of the vessel further into the air conditioning circuit.

Figure 4A:
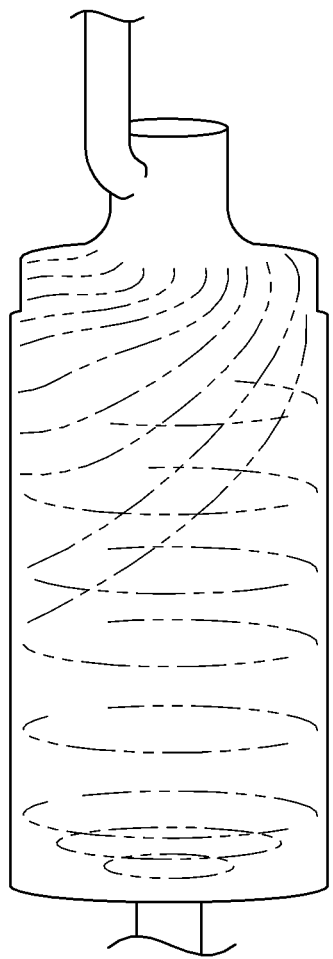
FIG. 4A shows the efficiency of the axial inlet cyclone of Example 1.
Figure 4B:
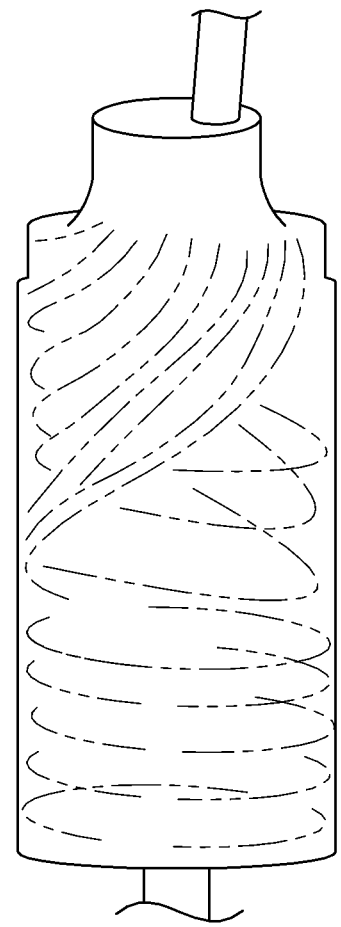
FIG. 4B shows the efficiency of a radial inlet cyclone.

FIG. 4 shows that the cyclone efficiency remains comparable to that of the radial inlet cyclone.

What is claimed is:

1. A cyclone for separation of a gas-liquid mixture in a vehicle air conditioning system with carbon dioxide as a refrigerant, the cyclone comprising:
   an inlet for the gas-liquid mixture;
   a body of the cyclone with a cylindrical inlet chamber, a cylindrical outlet chamber, and at least one stationary vane in a shape of a helix for ensuring rotation of the gas-liquid mixture in the outlet chamber; and
   a deflector facing towards the cylindrical outlet chamber of the body;
   wherein the inlet is arranged substantially coaxially with an axis of the cyclone and opens directly into the inlet chamber of the body of the cyclone, wherein the cylindrical inlet chamber, the at least one stationary vane in the shape of a helix, the cylindrical outlet chamber, and the deflector are arranged sequentially in order in the cyclone with respect to the axis of the cyclone, wherein the deflector faces towards an open end of the cylindrical outlet chamber, and wherein a side opening is formed between an edge of the open end of the cylindrical outlet chamber and an outer edge of the deflector.

2. The cyclone according to claim 1, wherein an outlet from the at least one stationary vane is oriented substantially perpendicular to the axis of the cyclone and tangentially to a diameter of the cylindrical inlet chamber of the cyclone, and wherein the at least one stationary vane is flat at an outlet end thereof.

3. The cyclone according to claim 1, wherein the cyclone separates gaseous carbon dioxide from liquid carbon dioxide and/or liquid oil.

4. The cyclone according to claim 1, wherein the cyclone is connected to a lid of one of a refrigerant accumulator or an accumulator with an internal heat exchanger, wherein the cyclone is on a side of the cylindrical inlet chamber coaxially connected to the lid of the refrigerant accumulator or the accumulator with the internal heat exchanger, and the inlet for the gas-liquid mixture passes through the lid substantially coaxially with the lid and the axis of the cyclone, and opens into the cylindrical inlet chamber.

5. A refrigerant accumulator that contains a vessel comprising:
   a lid;
   a bottom; and
   a shell, wherein the lid is coaxially connected to the cyclone according to claim 1, wherein an assembly of suction pipes passes between the lid and the bottom to pipe away a gaseous refrigerant component, wherein the deflector is placed behind the cylindrical outlet chamber, wherein an accumulation of oil is provided at the bottom of the vessel, and wherein the assembly of suction pipes further comprises:

an outer suction pipe for piping away the gaseous refrigerant component from the cyclone and the deflector to the accumulation of oil; and an inner pipe for piping away the gaseous refrigerant component from the accumulation of oil through the lid out of the accumulator, wherein the inlet passes through the lid substantially coaxially with the lid and the axis of the cyclone, and opens into the cylindrical inlet chamber.

6. An accumulator with an internal heat exchanger that contains an outer vessel comprising:

a lid;
a bottom;
a shell; and
an inner vessel, wherein the lid is coaxially connected to the cyclone according to claim 1, wherein an assembly of suction pipes passes between the lid and the bottom to pipe away the gaseous refrigerant component, wherein the deflector is placed behind the cylindrical outlet chamber in the inner vessel, wherein an accumulation of oil is provided at a bottom of the inner vessel, and wherein the internal heat exchanger is arranged between an outer wall of the inner vessel and an inner wall of the outer vessel, and wherein the assembly of suction pipes for piping away the gaseous refrigerant component further comprises:

an outer suction pipe for piping away the gaseous refrigerant component from the cyclone and the deflector to the accumulation of oil; and an inner pipe for piping away the gaseous refrigerant component from the accumulation of oil through the lid into the outer vessel of the accumulator, wherein the inlet passes through the lid substantially coaxially with the lid and the axis of the cyclone, and opens into the cylindrical inlet chamber.

7. The cyclone according to claim 1, wherein the side opening is in fluid communication with a bottom of a vessel configured to hold an accumulation of a liquid oil component of the gas-liquid mixture, the liquid oil component of the gas-liquid mixture configured to flow radially outwardly through the side opening and towards the accumulation of the liquid oil.

8. The cyclone according to claim 7, wherein an assembly of suction pipes extends from the deflector to pipe away a gaseous refrigerant component of the gas-liquid mixture.

9. The cyclone according to claim 8, wherein an opening formed through a central portion of the deflector forms an inlet into an outer suction pipe of the assembly of suction pipes, the outer suction pipe piping away the gaseous refrigerant component from the cyclone and the deflector to the accumulation of oil.

\* \* \* \* \*